(12) United States Patent
Van Den Berg et al.

(10) Patent No.: US 7,741,377 B2
(45) Date of Patent: Jun. 22, 2010

(54) SOLID CARBONACEOUS FEED TO LIQUID PROCESS

(75) Inventors: Robert Erwin Van Den Berg, Amsterdam (NL); Franciscus Gerardus Van Dongen, Amsterdam (NL); Thomas Paul Von Kossak-Glowczewski, Gummersbach (DE); Hendrik Jan Van Der Ploeg, Amsterdam (NL); Pieter Lammert Zuideveld, Amsterdam (NL)

(73) Assignee: Shell Oil Company, Houston, TX (US)

( * ) Notice: Subject to any disclaimer, the term of this patent is extended or adjusted under 35 U.S.C. 154(b) by 477 days.

(21) Appl. No.: 11/933,989

(22) Filed: Nov. 1, 2007

(65) Prior Publication Data

US 2008/0182912 A1 Jul. 31, 2008

Related U.S. Application Data

(60) Provisional application No. 60/865,134, filed on Nov. 9, 2006.

(30) Foreign Application Priority Data

Nov. 1, 2006 (EP) .................................. 06123315

(51) Int. Cl.
*C07C 27/00* (2006.01)
*C01B 3/32* (2006.01)
*C10G 47/00* (2006.01)

(52) U.S. Cl. ..................... 518/700; 518/702; 518/703; 518/715; 48/127.5; 208/107

(58) Field of Classification Search ................ 518/700, 518/702, 703, 715; 48/127.5; 208/107
See application file for complete search history.

(56) References Cited

U.S. PATENT DOCUMENTS

| 4,523,529 | A | 6/1985 | Poll |
| 4,836,146 | A | 6/1989 | Russell et al. |
| 4,887,962 | A | 12/1989 | Hasenack et al. |
| 6,933,324 | B2 | 8/2005 | Stamires et al. |
| 6,976,362 | B2 | 12/2005 | Sheppard et al. |
| 2005/0196332 | A1 | 9/2005 | Demierel et al. |
| 2005/0203194 | A1 | 9/2005 | Botes et al. |

FOREIGN PATENT DOCUMENTS

| DE | 2610892 | 7/1977 |
| DE | 4336790 | 5/1995 |
| EP | 400740 | 12/1990 |
| EP | 416212 | 3/1991 |
| EP | 510771 | 10/1992 |
| EP | 450861 | 7/1995 |
| EP | 0662506 | 7/1995 |
| EP | 926441 | 6/1999 |
| EP | 1509323 | 7/2007 |
| WO | WO0176736 | 10/2001 |
| WO | WO0202489 | 1/2002 |
| WO | WO0207882 | 1/2002 |
| WO | WO2004005438 | 1/2004 |
| WO | WO2006070018 | 7/2006 |

*Primary Examiner*—Jafar Parsa

(57) ABSTRACT

A process to prepare a paraffinic hydrocarbon from a solid carbonaceous feedstock, preferably coal by performing the following steps,
(a) feeding an oxygen comprising gas and the carbonaceous feedstock to a burner positioned horizontal and firing into a reactor vessel,
(b) performing a partial oxidation of the carbonaceous feedstock in said burner to obtain a stream of hot synthesis gas which flows upwardly relative to the burner and a liquid slag which flows downwardly relative to the burner,
(c) cooling the hot synthesis gas by first cooling the gas to a temperature of between 500 and 900° C. by injecting a gaseous or liquid cooling medium into the synthesis gas and subsequently second cooling the gas in to below 500° C. by directly contacting with water,
(d) separating solids from the cooled synthesis gas by means of a water scrubbing process step,
(e) performing a water shift reaction on at least part of the scrubbed synthesis gas,
(f) separating sulphur compounds, carbon dioxide and other possible impurities from the shifted gas to obtain a purified synthesis gas, and
(g) performing a Fischer-Tropsch synthesis using the purified synthesis gas of step (f) to obtain a synthesis product comprising paraffinic hydrocarbons.

21 Claims, 5 Drawing Sheets

SOLID CARBONACEOUS FEED TO LIQUID PROCESS

This application claims the benefit of European Application No. 06123315.1 filed Nov. 1, 2006 and U.S. Provisional Application 60/865,134 filed Nov. 9, 2006, both of which are incorporated herein by reference.

TECHNICAL FIELD OF THE INVENTION

The present invention relates to improvements relating to a solid carbonaceous feed to liquids process involving a Fischer-Tropsch synthesis.

BACKGROUND OF THE INVENTION

The Fischer-Tropsch process can be used for the conversion of (hydro)carbonaceous feedstocks into liquid and/or solid hydrocarbons. The feedstock, e.g. natural gas, associated gas, coal-bed methane, biomass, heavy oil residues, coal, is converted in a first step into a mixture of hydrogen and carbon monoxide (this mixture is often referred to as synthesis gas or syngas). The synthesis gas is then fed into a reactor where it is converted over a suitable catalyst at elevated temperature and pressure into paraffinic compounds ranging from methane to high molecular weight molecules comprising up to 200 carbon atoms, or, under particular circumstances, even more. Examples of the Fischer-Tropsch process are described in e.g. WO-A-02/02489, WO-A-01/76736, WO-A-02/07882, EP-A-510771 and EP-A-450861.

WO-A-2006/070018 describes a process wherein preferably coal is converted into a synthesis gas by means of partial oxidation. Part of the synthesis gas is subjected to a catalytic water shift process step and combined with non-shifted synthesis gas. The resulting mixture is used to perform a Fischer-Tropsch synthesis to obtain a paraffinic product. In this publication reference is made to the well-known gasification processes for coal.

Examples of well-known coal gasification processes are described in U.S. Pat. No. 4,836,146 and in WO-A-2004/005438. U.S. Pat. No. 4,836,146 describes a gasification system for a solid particulate comprising a gasification reactor and a synthesis gas cooling vessel. In this publication a method and apparatus is described for controlling rapping of the heat exchange surfaces as present in the separate cooling vessel. Rapping is required to avoid deposits to accumulate on the surfaces of the heat exchangers.

A problem with the syngas cooler of WO-A-2004/005438 and U.S. Pat. No. 4,836,146 is that the heat exchanging surfaces introduce a large complexity to the design of said apparatuses. Furthermore extensive measures like rapping are required to avoid deposits to accumulate on the heat exchanger surfaces. Another problem is that the heat exchanging surfaces are even more vulnerable to fouling from feedstocks with for instance a high alkaline content. There is thus a desire to process high alkaline feedstocks as well as a desire to provide more simple processes. This especially wherein the synthesis gas is used in a Fischer-Tropsch process, which in itself is already a complicated process.

EP-A-0400740 describes a process wherein syngas is produced by gasification of solid fuel in a reactor vessel equipped with tangential burners. The obtained slag flows downwardly while the syngas flows upwardly and is quenched in a single quench section located above the reactor.

The afore discussed gasification reactors have in common that the synthesis gas as produced flows substantially upwards and the slag flows substantially downwards relative to the gasification burners as present in said reactors. Thus, all these reactors have an outlet for slag, which is separate from the outlet for synthesis gas. These reactors have the advantage that large capacities per reactor are achievable. These reactors are different from a class of gasification reactors as for example described in EP-A-926441 and U.S. Pat. No. 4,946,476 where both slag and synthesis gas flow downwardly and wherein both the outlet for slag and synthesis gas are located at the lower end of the reactor.

It would be advantageous to provide a more simple process to prepare a paraffinic product from a solid carbonaceous feed using the 'high capacity gasification reactors' as described above.

SUMMARY OF THE INVENTION

The following process provides such a more simple process. In a preferred embodiment, the present invention provides a process to prepare a paraffinic hydrocarbon from solid carbonaceous feedstock by performing the following steps, (a) feeding an oxygen comprising gas and the carbonaceous feedstock to a burner positioned horizontal and firing into a reactor vessel, (b) performing a partial oxidation of the carbonaceous feedstock in said burner to obtain a stream of hot synthesis gas which flows upwardly relative to the burner and a liquid slag which flows downwardly relative to the burner, (c) cooling the hot synthesis gas by directly contacting the gas with liquid water, first cooling the gas to a temperature of between 500 and 900° C. by injecting a gaseous or liquid cooling medium into the synthesis gas and subsequently cooling the gas to below 500° C. by direct contact with water, (d) separating solids from the cooled synthesis gas by means of a water scrubbing process step, (e) performing a water shift reaction on at least part of the scrubbed synthesis gas, (f) separating sulphur compounds, carbon dioxide and other possible impurities from the shifted gas to obtain a purified synthesis gas, (g) performing a Fischer-Tropsch synthesis using the purified synthesis gas of step (f) to obtain a synthesis product comprising paraffinic hydrocarbons.

An advantage of the claimed process is that the synthesis gas obtained after the cooling step (c) and step (d) comprises a sufficient amount of water to perform a water shift reaction of step (e).

BRIEF DESCRIPTION OF THE DRAWINGS

The invention has been illustrated by the following figures.

DETAILED DESCRIPTION OF THE INVENTION

Figure 1:
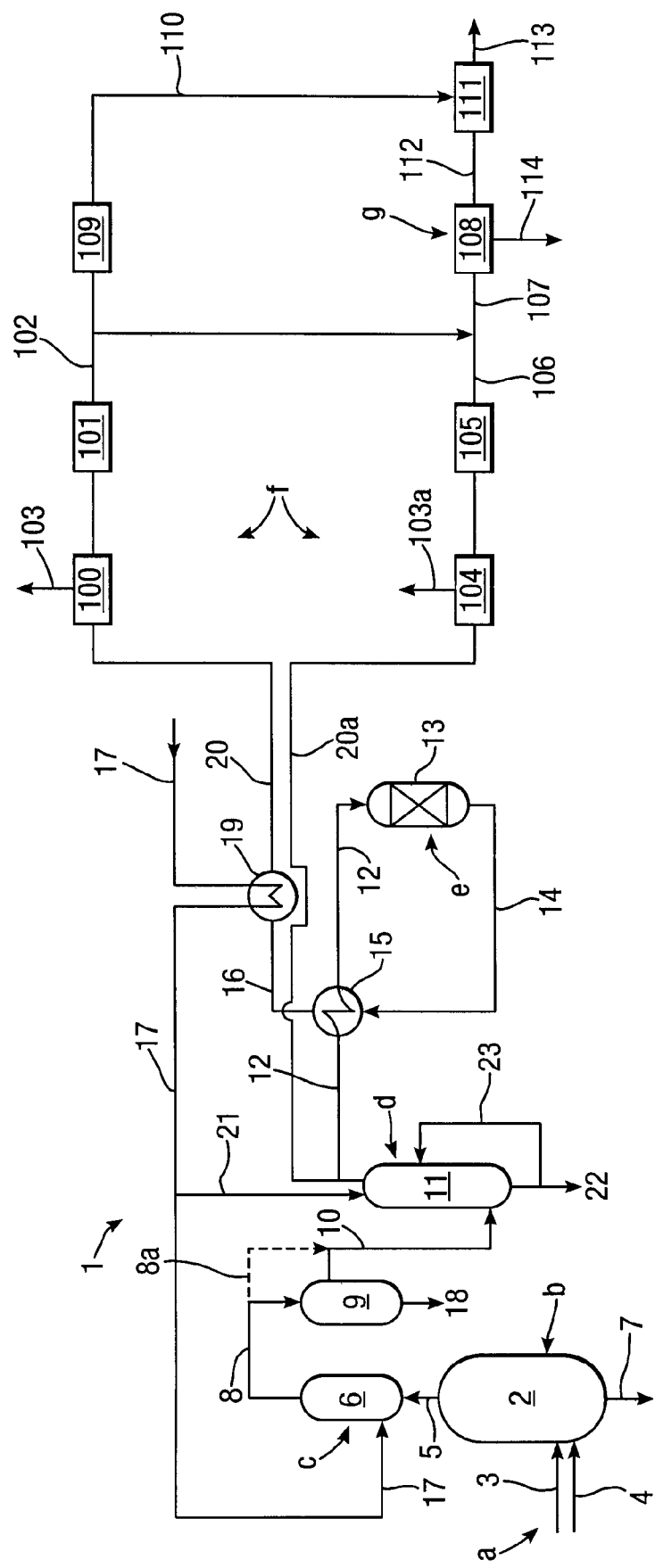
FIG. 1 schematically shows a process scheme for performing a method according the present invention.

Preferred solid carbonaceous feeds as used in step (a) are ash and sulphur containing feedstocks, preferably coal, biomass, for example wood, and waste. More preferably the solid carbonaceous feed is substantially (i.e. >90 wt. %) comprised of naturally occurring coal or synthetic (petroleum)cokes, most preferably coal. Suitable coals include lignite, bituminous coal, sub-bituminous coal, anthracite coal, and brown coal.

In step (a) an oxygen comprising gas and the carbonaceous feedstock is fed to a burner positioned horizontal and firing into a reactor vessel. In step (b) a partial oxidation of the carbonaceous feedstock in said burner is performed to obtain a stream of hot synthesis gas. This stream of hot synthesis gas flows upwardly relative to the burner and a liquid slag flows downwardly relative to the burner. The partial oxidation is carried out by partially combusting the carbonaceous feed with a limited volume of oxygen at a temperature normally between 800° C. and 2000° C., preferably between 1400 and 1800° C., in the absence of a catalyst at a pressure between 20 and 100 bar. In order to achieve a more rapid and complete gasification, initial pulverisation of the solid carbonaceous feed is preferred. When the feedstock is coal the term fine particulates is intended to include at least pulverized particulates having a particle size distribution so that at least about 90% by weight of the material is less than 90 µm and moisture content is typically between 2 and 8% by weight, and preferably less than about 5% by weight.

The gasification is preferably carried out in the presence of oxygen comprising gas and optionally some steam, the purity of the oxygen comprising gas preferably being at least 90% by volume, nitrogen, carbon dioxide and argon being permissible as impurities. Substantially pure oxygen is preferred, such as prepared by an air separation unit (ASU). The oxygen comprising gas may contain some steam. Steam acts as moderator gas in the gasification reaction. The ratio between oxygen and steam is preferably from 0 to 0.3 parts by volume of steam per part by volume of oxygen. The oxygen used is preferably heated before being contacted with the coal, preferably to a temperature of from about 200 to 500° C.

The partial oxidation reaction is preferably performed by combustion of a dry mixture of fine particulates of the carbonaceous feed and a carrier gas with oxygen in a suitable burner. Examples of suitable burners are described in U.S. Pat. No. 4,888,7962, U.S. Pat. No. 4,523,529 and U.S. Pat. No. 4,510,874. The gasification chamber is preferably provided with one or more pairs of partial oxidation burners, wherein said burners are provided with supply means for a solid carbonaceous feed and supply means for an oxygen containing gas. With a pair of burners is here meant two burners, which are directed horizontal and diametric into the gasification chamber. This results in a pair of two burners in a substantially opposite direction at the same horizontal position. The reactor may be provided with 1 to 5 of such pairs of burners, preferably 2 to 5 of such pairs. The upper limit of the number of pairs will depend on the size of the reactor. The firing direction of the burners may be slightly tangential as for example described in EP-A-400740.

Examples of suitable carrier gasses to transport the dry and solid feed to the burners are steam, nitrogen, synthesis gas and preferably carbon dioxide. Carbon dioxide is preferred because it achieves a better selectivity to synthesis gas.

In step (c) the hot synthesis gas is cooled by directly contacting the gas with liquid water. The direct contacting is preferably achieved by injecting liquid water into the gaseous stream of synthesis gas or by passing the synthesis gas through a water bath or combinations of said methods. The hot synthesis gas which is contacted with liquid water may be partly cooled before contacting. Preferably the partly cooling is performed by injecting a quench gas into the hot synthesis gas wherein the temperature is reduced from between 1400 and 1800° C. to a temperature between 500 and 900° C. Cooling with a gas quench is well known and described in for example EP-A-416242, EP-A-662506 and WO-A-2004/005438. Examples of suitable quench gases are recycle synthesis gas and steam. This first cooling step is preferred to achieve a gas temperature below the solidification temperature of the non-gaseous components present in the hot synthesis gas.

More preferably the first cooling is performed by injecting a mist of liquid droplets into the gas flow as will be described in more detail below. The use of the liquid mist as compared to a gas quench is advantageous because of the larger cooling capacity of the mist. The liquid may be any liquid having a suitable viscosity in order to be atomized. Non-limiting examples of the liquid to be injected are a hydrocarbon liquid, a waste stream etc. Preferably the liquid comprises at least 50% water. Most preferably the liquid is substantially comprised of water (i.e. >95 vol %). Examples of suitable sources of water are the wastewater, also referred to as black water, as obtained in the synthesis gas scrubber or the process condensate of the downstream water shift reactor. More preferably the water by-product as obtained in step (g) is used. This water condensate is the water portion as obtained as by-product when performing step (g) and will typically contain water as the predominant component and water soluble compounds as produced in the Fischer-Tropsch synthesis. These compounds are for example alcohols, carboxylic acids and other oxygenates. These compounds will at least in part decompose at the elevated temperature conditions when contacted with the hot synthesis gas. By using this water in this manner a costly and complicated waste water process for the water by-product of step (g) is avoided.

With the term 'mist' is meant that the liquid is injected in the form of small droplets. If water is to be used as the liquid, then preferably more than 80%, more preferably more than 90%, of the water is in the liquid state. Preferably the injected mist has a temperature of at most 50° C. below the bubble point at the prevailing pressure conditions at the point of injection, particularly at most 15° C., even more preferably at most 10° C. below the bubble point. To this end, if the injected liquid is water, it usually has a temperature of above 90° C., preferably above 150° C., more preferably from 200° C. to 230° C. The temperature will obviously depend on the operating pressure of the gasification reactor, i.e. the pressure of the raw synthesis as specified further below. Hereby a rapid vaporization of the injected mist is obtained, while cold spots are avoided. As a result the risk of ammonium chloride deposits and local attraction of ashes in the gasification reactor is reduced.

Further it is preferred that the mist comprises droplets having a diameter of from 50 to 200 µm, preferably from 100 to 150 µm. Preferably, at least 80 vol. % of the injected liquid is in the form of droplets having the indicated sizes.

To enhance quenching of the hot synthesis gas, the mist is preferably injected with a velocity of 30-90 m/s, preferably 40-60 m/s.

Also it is preferred that the mist is injected with an injection pressure of at least 10 bar above the pressure of the raw synthesis gas as present in the gasification reactor, preferably from 20 to 60 bar, more preferably about 40 bar, above the pressure of the raw synthesis gas. If the mist is injected with an injection pressure of below 10 bar above the pressure of the raw synthesis gas, the droplets of the mist may become too large. The latter may be at least partially offset by using an atomisation gas, which may e.g. be $N_2$, $CO_2$, steam or synthesis gas, more preferably steam or synthesis gas. Using atomisation gas has the additional advantage that the difference between injection pressure and the pressure of the raw synthesis gas may be reduced to a pressure difference of between 5 and 20 bar.

Further it has been found especially suitable when the mist is injected in a direction away from the gasification reactor, or said otherwise when the mist is injected in the flow direction of the synthesis gas, more preferably under an angle. Hereby no or less dead spaces occur which might result in local deposits on the wall of the apparatus in which step (c) is performed. Preferably the mist is injected under an angle of between 30-60°, more preferably about 45°, with respect to a plane perpendicular to the longitudinal axis of the conduit or vessel in which the cooling takes place.

According to a further preferred embodiment, the injected mist is at least partially surrounded by a shielding fluid. Herewith the risk of forming local deposits is reduced. The shielding fluid may be any suitable fluid, but is preferably selected from the group consisting of an inert gas such as $N_2$ and $CO_2$, synthesis gas, steam and a combination thereof.

The partly cooled synthesis gas having a temperature of between 500 and 900° C. is further cooled in a second cooling, to a temperature of below 500° C., according to the process of step (c) by directly contacting the gas with liquid water. The direct cooling with liquid water may suitably be performed by injecting a mist of liquid water into the synthesis gas as described above. According to an especially preferred embodiment, the total amount of water injected is selected such that the cooled synthesis gas comprises at least 40 vol. % $H_2O$, preferably from 40 to 60 vol. % $H_2O$, more preferably from 45 to 55 vol. % $H_2O$. The cooled synthesis gas, preferably having this water content, is preferably subjected to a dry-solids removal step to at least partially remove dry ash. Preferred solids removal units are cyclones or filter units as for example described in EP-A-551951 and EP-A-1499418.

In the above-described second cooling step the partly cooled synthesis gas may also be cooled such that the amount of water added relative to the raw synthesis gas is even higher than the preferred ranges above. This embodiment is referred to as a so-called overquench. In an overquench type process the amount of water added is such that not all liquid water will evaporate and some liquid water will remain in the cooled raw synthesis gas. Such a process is advantageous because a dry solid removal step can be omitted. In such a process the raw synthesis gas leaving the cooling vessel is saturated with water. The weight ratio of the raw synthesis gas and water injection is suitably between 1:1 to 1:4.

Overquench type process conditions may be achieved by injecting a large amount of water into the flow path of the synthesis gas, by passing the flow of synthesis gas through a water bath positioned at the lower end of the cooling vessel or combinations of these measures.

It has been found that herewith the capital costs can be substantially lowered, as no further or significantly less addition of steam in an optional downstream water shift conversion step is necessary. With capital costs is here meant the capital costs for steam boilers to generate said steam which would otherwise be added.

In step (d) solids are separated from the cooled synthesis gas by means of a water scrubbing process step. Such a process step is well known and therefore not described in detail. The water scrubbing step generates a water stream containing solids, also referred to as black water.

In step (e) the gaseous stream as obtained in step (d) is shift converted by at least partially converting CO into $CO_2$, thereby obtaining a CO depleted stream. In this step the $H_2/CO$ ratio of the synthesis gas is increased from a lower level, typically below 1 and especially from between 0.3-0.6 for coal-derived synthesis gas to a higher value preferably above 1. The higher $H_2/CO$ ratio is preferred to perform step (g) in the most optimal manner. The optimal $H_2/CO$ ratio for step (g) will be dependent on the type of catalyst used in step (g). For example a cobalt based Fischer-Tropsch catalyst will as a rule require a higher $H_2/CO$ ratio than an iron based Fischer-Tropsch catalyst. Preferably the $H_2/CO$ ratio of the CO depleted stream for a cobalt catalyzed Fischer-Tropsch process is between 1.4 and 1.95, preferably greater than 1.5, more preferably in the range 1.6-1.9, and even more preferably in the range 1.6-1.8. For an iron based Fischer-Tropsch catalyst process the preferred $H_2/CO$ ratio is between 1 and 1.4.

The water shift conversion reaction as performed in step (e) is well known in the art. Generally, water, usually in the form of steam, is mixed with the gaseous stream to form carbon dioxide and hydrogen. The catalyst used can be any of the known catalysts for such a reaction, including iron, chromium, copper and zinc. Copper on zinc oxide is a known shift catalyst.

The catalytic water shift conversion reaction of step (e) provides a hydrogen enriched, often highly enriched, synthesis gas, possibly having a $H_2/CO$ ratio above 3, more suitably above 5, preferably above 7, more preferably above 15, possibly 20 or even above.

In order to arrive at the desired $H_2/CO$ ratio for performing step (g) it is preferred to perform step (e) only on part of the gaseous stream obtained in step (d). In this preferred embodiment the scrubbed synthesis gas of step (d) is divided into at least two sub-streams, one of which undergoes step (e) to obtain a first CO depleted stream. This first CO depleted stream is combined with the second sub-stream to form a second CO depleted stream having the desired $H_2/CO$ ratio for performing step (g). Alternatively the cooled synthesis gas of step (c) may be split into at least two streams. Each stream is subjected to a scrubbing step (d) separately. At least one stream is subjected to a step (e) to obtain a first CO depleted stream and at least one stream is not subjected to a step (e) to obtain the second sub-stream.

If desired one or more of the sub-stream(s) which are not subjected to step (e) could be used for other parts of the process rather than being combined with the converted sub-stream(s). Preferably part of such sub-stream is used for steam or power generation.

Hydrogen is preferably prepared from part of a CO depleted stream, more preferably from the first CO depleted stream. Hydrogen is preferably prepared in a Pressure Swing Adsorption (PSA) unit, a membrane separation unit or combinations of these. The hydrogen manufactured in this way can then be used as the hydrogen source in a possible further hydroprocessing step wherein the hydrocarbon products as made in step (g) are used as feed. This arrangement reduces or even eliminates the need for a separate source of hydrogen, e.g. from an external supply, which is otherwise commonly used where available.

The division of the gaseous stream as obtained in step (d), or optionally in step (c), into sub-streams can be such so as to create any desired H$_2$/CO ratio following their recombination. Any degree or amount of division is possible. Where the gaseous stream are divided into two sub-streams, the division into the sub-streams could be in the range 80:20 to 20:80 by volume, preferably 70:30 to 30:70 by volume, depending upon the desired final H$_2$/CO ratio. Simple analysis of the H$_2$/CO ratios in the second CO depleted stream and knowledge of the desired ratio allows easy calculation of the division. In the case that one stream is to be used as feed for e.g. a second stage of a Fischer-Tropsch process in step (g), this stream will usually be between 10 and 50%, preferably between 20 and 35% of the first CO depleted stream.

The simple ability to change the degree of division into the sub-streams also provides a simple but effective means of accommodating variation in the H$_2$/CO ratio in the gaseous stream as obtained in step (b) which variations are primarily due to variation in feedstock quality. With feedstock quality is here meant especially the hydrogen and carbon content of the original carbonaceous feedstock, for example, the 'grade' of coal. Certain grades of coal generally having a higher carbon content will, after gasification of the coal, provide a greater production of carbon monoxide, and thus a lower H$_2$/CO ratio. However, using other grades of coal means removing more contaminants or unwanted parts of the coal, such as ash and sulphur and sulphur-based compounds. The ability to change the degree of division of the synthesis gas stream into the sub-streams allows the process to use a variety of feedstocks, especially 'raw' coal, without any significant re-engineering of the process or equipment to accommodate expected or unexpected variation in such coals.

In step (f) sulphur compounds, carbon dioxide and other possible impurities are separated from the synthesis gas before said gas is used in step (g). Suitably the synthesis gas is subjected to a CO$_2$ recovery system thereby obtaining a CO$_2$ rich stream and a CO$_2$ poor stream and wherein the CO$_2$ poor stream is used in step (g). The CO$_2$ rich stream may be used as the CO$_2$ containing transport gas in step (a).

It is preferred to remove at least 80 vol %, preferably at least 90 vol %, more preferably at least 95 vol % and at most 99.5 vol % of the CO$_2$ as is present in the synthesis gas intended for use in step (g). This avoids the build-up of inerts in the Fischer-Tropsch process of step (g). Part of the CO$_2$ is preferably used in step (a) in an embodiment wherein CO$_2$ is used as carrier gas. Excess CO$_2$ is preferably stored in sub-surface reservoirs or used more preferably for enhanced oil or gas recovery or enhanced coal bed methane recovery. Excess CO$_2$ may also be sequestered by mineral carbonation such as for example described in WO-A-02/085788.

The CO$_2$ recovery system is preferably a combined carbon dioxide/hydrogen sulfide removal system, preferably wherein the removal system uses a physical solvent process. The CO$_2$ recovery may be performed on the CO-depleted stream or alternatively on the second CO-depleted stream. More preferably the CO$_2$ recovery from the sub-stream, which stream is not being subjected to step (e), is performed separately from the CO$_2$ recovery from the first CO depleted stream before said streams are combined.

On an industrial scale there are chiefly two categories of absorbent solvents, depending on the mechanism to absorb the acidic components: chemical solvents and physical solvents. Each solvent has its own advantages and disadvantages as to features as loading capacity, kinetics, regenerability, selectivity, stability, corrosivity, heat/cooling requirements etc.

Chemical solvents which have proved to be industrially useful are primary, secondary and/or tertiary amines derived from alkanolamines. The most frequently used amines are derived from ethanolamine, especially monoethanol amine (MEA), diethanolamine (DEA), triethanolamine (TEA), diisopropanolamine (DIPA) and methyldiethanolamine (MDEA).

Physical solvents which have proved to be industrially suitable are cyclo-tetramethylenesulfone and its derivatives, aliphatic acid amides, N-methylpyrrolidone, N-alkylated pyrrolidones and the corresponding piperidones, methanol, ethanol and mixtures of dialkylethers of polyethylene glycols.

A well-known commercial process uses an aqueous mixture of a chemical solvent, especially DIPA and/or MDEA, and a physical solvent, especially cyclotetramethylene-sulfone. Such systems show good absorption capacity and good selectivity against moderate investment costs and operational costs. They perform very well at high pressures, especially between 20 and 90 bara.

The physical absorption process is preferred and is well known to the man skilled in the art. Reference can be made to e.g. Perry, Chemical Engineerings' Handbook, Chapter 14, Gas Absorption. The liquid absorbent in the physical absorption process is suitably methanol, ethanol, acetone, dimethyl ether, methyl i-propyl ether, polyethylene glycol or xylene, preferably methanol. This process is based on carbon dioxide and hydrogen sulfide being highly soluble under pressure in the methanol, and then being readily releasable from solution when the pressure is reduced as further discussed below. This high pressure system is preferred due to its efficiency, although other removal systems such as using amines are known. The physical absorption process is suitably carried out at low temperatures, preferably between −60° C. and 0° C., preferably between −30 and −10° C.

The physical absorption process is carried out by contacting the light products stream in a counter-current upward flow with the liquid absorbent. The absorption process is preferably carried out in a continuous mode, in which the liquid absorbent is regenerated. This regeneration process is well known to the man skilled in the art. The loaded liquid absorbent is suitably regenerated by pressure release (e.g. a flashing operation) and/or temperature increase (e.g. a distillation process). The regeneration is suitably carried out in two or more steps, preferably 3-10 steps, especially a combination of one or more flashing steps and a distillation step.

The regeneration of solvent from the process is also known in the art. Preferably, the present invention involves one integrated solvent regeneration tower. Further process conditions are for example described in DE-A-2610982 and DE-A-4336790.

Preferably the synthesis gas is subjected to one or more further removal systems prior to using said stream in step (g). These removal systems may be guard or scrubbing units, either as back-up or support to the CO$_2$/H$_2$S removal system, or to assist in the reduction and/or removal of other contaminants such as HCN, NH$_3$, COS and H$_2$S, metals, carbonyls, hydrides or other trace contaminants.

Step (g) comprises the well-known Fischer-Tropsch synthesis. The Fischer-Tropsch synthesis is well known to those skilled in the art and involves synthesis of hydrocarbons, especially paraffinic hydrocarbons, from a mixture of hydrogen and carbon monoxide by contacting said mixture at reaction conditions with a Fischer-Tropsch catalyst.

Products of the Fischer-Tropsch synthesis may range from methane to heavy paraffinic waxes. Preferably, the production of methane is minimised and a substantial portion of the hydrocarbons produced have a carbon chain length of a least 5 carbon atoms. Preferably, the amount of C$_5$+ hydrocarbons is at least 60% by weight of the total product, more preferably, at least 70% by weight, even more preferably, at least 80% by weight, most preferably at least 85% by weight. Reaction products, which are liquid phase under reaction conditions, may be physically separated gas phase products such as light hydrocarbons and water by-product may be removed using suitable means known to the person skilled in the art.

Fischer-Tropsch catalysts are known in the art, and typically include a Group VIII metal component, preferably cobalt, iron and/or ruthenium, more preferably iron and cobalt. The Fischer-Tropsch synthesis may be carried out in a multi-tubular reactor, a slurry phase regime or an ebullating bed regime, wherein the catalyst particles are kept in suspension by an upward superficial gas and/or liquid velocity.

In a preferred embodiment of the invention step (g) is performed by an iron catalysed Fischer-Tropsch synthesis reaction because a smaller portion of the scrubbed gas needs to be subjected to step (e). More preferably the reaction is performed in a slurry phase reactor or in an ebullating bed regime. Examples of iron based processes are those described in US-A-20050203194, US-A-20050196332, U.S. Pat. No. 6,976,362, U.S. Pat. No. 6,933,324 and EP-A-1509323.

In another preferred embodiment a cobalt-based catalyst is used. It has been found that by using a cobalt catalysed Fischer-Tropsch process a very heavy Fischer-Tropsch wax product may be obtained. The cobalt catalysed Fischer-Tropsch process may be carried out in a slurry phase reactor or in an ebullating bed regime and more preferably in a multi-tubular reactor. Typically, the catalysts comprise a catalyst carrier. The catalyst carrier is preferably porous, such as a porous inorganic refractory oxide, more preferably alumina, silica, titania, zirconia or mixtures thereof.

The optimum amount of catalytically active metal present on the carrier depends inter alia on the specific catalytically active metal. Typically, the amount of cobalt present in the catalyst may range from 1 to 100 parts by weight per 100 parts by weight of carrier material, preferably from 10 to 50 parts by weight per 100 parts by weight of carrier material.

The catalytically active metal may be present in the catalyst together with one or more metal promoters or co-catalysts. The promoters may be present as metals or as the metal oxide, depending upon the particular promoter concerned. Suitable promoters include oxides of metals from Groups IIA, IIIB, IVB, VB, VIIB and/or VIIB of the Periodic Table, oxides of the lanthanides and/or the actinides. Preferably, the catalyst comprises at least one of an element in Group IVB, VB and/or VIIB of the Periodic Table, in particular titanium, zirconium, manganese and/or vanadium. As an alternative or in addition to the metal oxide promoter, the catalyst may comprise a metal promoter selected from Groups VIIB and/or VIII of the Periodic Table. Preferred metal promoters include rhenium, platinum and palladium.

Reference to "Groups" and the "Periodic Table" as used herein relate to the "previous IUPAC form" of the Periodic Table such as that described in the 68th edition of the Handbook of Chemistry and Physics (CPC Press).

A most suitable catalyst comprises cobalt as the catalytically active metal and zirconium as a promoter. Another most suitable catalyst comprises cobalt as the catalytically active metal and manganese and/or vanadium as a promoter.

The promoter, if present in the catalyst, is typically present in an amount of from 0.1 to 60 parts by weight per 100 parts by weight of carrier material. It will however be appreciated that the optimum amount of promoter may vary for the respective elements which act as promoter. If the catalyst comprises cobalt as the catalytically active metal and manganese and/or vanadium as promoter, the cobalt:(manganese+ vanadium) atomic ratio is advantageously at least 12:1.

The Fischer-Tropsch synthesis is preferably carried out at a temperature in the range from 125 to 350° C., more preferably 175 to 275° C., most preferably 200 to 260° C. The pressure preferably ranges from 5 to 150 bar abs., more preferably from 5 to 80 bar abs.

Step (g) may be a single stage or multi-stage process, each stage having one or more reactors. In a multi-stage process, the hydrogen enriched conversion sub-stream could be combined with syngas prior to one or more of the stages, either directly or indirectly. Different types of catalyst may be used in the different stages. For example the first stage may be performed with a cobalt-based catalyst and the second stage with an iron based catalyst. In this manner effective use is made in the second stage of the non-converted synthesis gas of the first stage having a lower $H_2/Co$ ratio.

Preferably the Fischer-Tropsch synthesis product as obtained in step (g) is subjected to a hydroprocessing step to obtain a hydroprocessed effluent from which a middle distillate fuel is isolated. Middle distillate fuels are kerosene and gas oil.

Same reference numbers as used below refer to similar structural elements.

Reference is made to FIG. 1. FIG. 1 schematically shows a system 1 for producing synthesis gas. In a gasification reactor 2 a carbonaceous stream and an oxygen containing stream may be fed via lines 3, 4, respectively.

The solid carbonaceous feed is at least partially oxidised in the gasification reactor 2, thereby obtaining a synthesis gas and a slag. To this end usually several burners (not shown) are present in the gasification reactor 2. The produced hot synthesis gas is fed via line 5 to a cooling section 6; herein the hot synthesis gas is cooled by contacting with liquid water 17. Into the cooling section 6 liquid water is injected via line 17 as will be further discussed in FIG. 2 below. The slag drops down and is drained through line 7 for optional further processing.

As shown in the embodiment of FIG. 1, the cooled synthesis gas leaving the cooling section 6 is further processed. To this end, it is fed via line 8 into a dry solids removal unit 9 to at least partially remove dry ash in the cooled synthesis gas. Dry ash is removed from the dry solids removal unit via line 18. In an overquench mode of operation said dry-solids removal unit 9 is omitted and the cooled synthesis gas is directly fed to a wet gas scrubber 11 via line 8a and 10.

After the dry solids removal unit 9 the synthesis gas is fed via line 10 to a wet gas scrubber 11. Part of the scrubbed gas is subsequently fed via line 12 to a shift converter 13 to react at least a part of the water with CO to produce $CO_2$ and $H_2$, thereby obtaining a first CO-depleted stream in line 14. Another part, the second sub-stream, of the scrubbed gas by-passes the shift converter 13 via line 20a. Waste water from gas scrubber 11 is removed via line 22 and optionally partly recycled to the gas scrubber 11 via line 23.

It has surprisingly been found that according to the present invention, the vol. % water of the stream leaving the cooling section 6 in line 8 is already such that the capacity of the wet gas scrubber 11 may be substantially lowered, resulting in a significant reduction of capital expenses.

Further improvements are achieved when the raw synthesis gas in line 12 is heated in a heat exchanger 15 against the shift converted synthesis gas in line 14 that is leaving the shift converter 13.

Further it is preferred that energy contained in the stream of line 16 leaving heat exchanger 15 is used to warm up the water in line 17 to be injected in cooling section 6. To this end, the stream in line 16 may be fed to an indirect heat exchanger 19, for indirect heat exchange with the stream in line 17.

As shown in the embodiment in FIG. 1, the stream in line 14 is first fed to the heat exchanger 15 before entering the indirect heat exchanger 19 via line 16. However, the person skilled in the art will readily understand that the heat exchanger 15 may be dispensed with, if desired, or that the stream in line 14 is first fed to the indirect heat exchanger 19 before heat exchanging in heat exchanger 15. If desired the heated stream in line 17 may also be partly used as a feed (line 21) to the gas scrubber 11.

In FIG. 1 is also shown that the first CO depleted stream in line 20 is fed to a combined carbon dioxide/hydrogen sulphide removal system 100 and one or more guard beds 101. $CO_2$ is discharged via line 103. The second substream in line 20a is fed to a combined carbon dioxide/hydrogen sulphide removal system 104 and one or more guard beds 105. $CO_2$ is discharged via line 103a. Part or all of the first purified CO depleted stream in line 102 is combined with the purified second substream in line 106 to obtain a second CO depleted stream in line 107. Another part of the purified first CO depleted stream 102 is fed to a Pressure Swing Adsorption (PSA) unit 109 to obtain purified hydrogen in line 110. The combined second CO depleted stream, the purified synthesis gas, is fed via line 107 to a Fischer-Tropsch reactor 108. In said reactor 108a paraffinic hydrocarbon product is obtained and discharged via line 112. A water by-product is discharged via line 114. This water-by product may be advantageously used in step (c) and supplied to the system via line 17. The paraffinic hydrocarbon product may be further processed in a hydroprocessing reactor 111, for example a hydroisomerisation/hydrocracking reactor, making use of the hydrogen in line 110. The hydroprocessing reactor, catalyst and conditions are well known to the skilled person and for example described in EP-A-537815 and EP-A-532117. The reaction products, kerosene and gas oil, being among the main products, are discharged via line 113.

Figure 2:
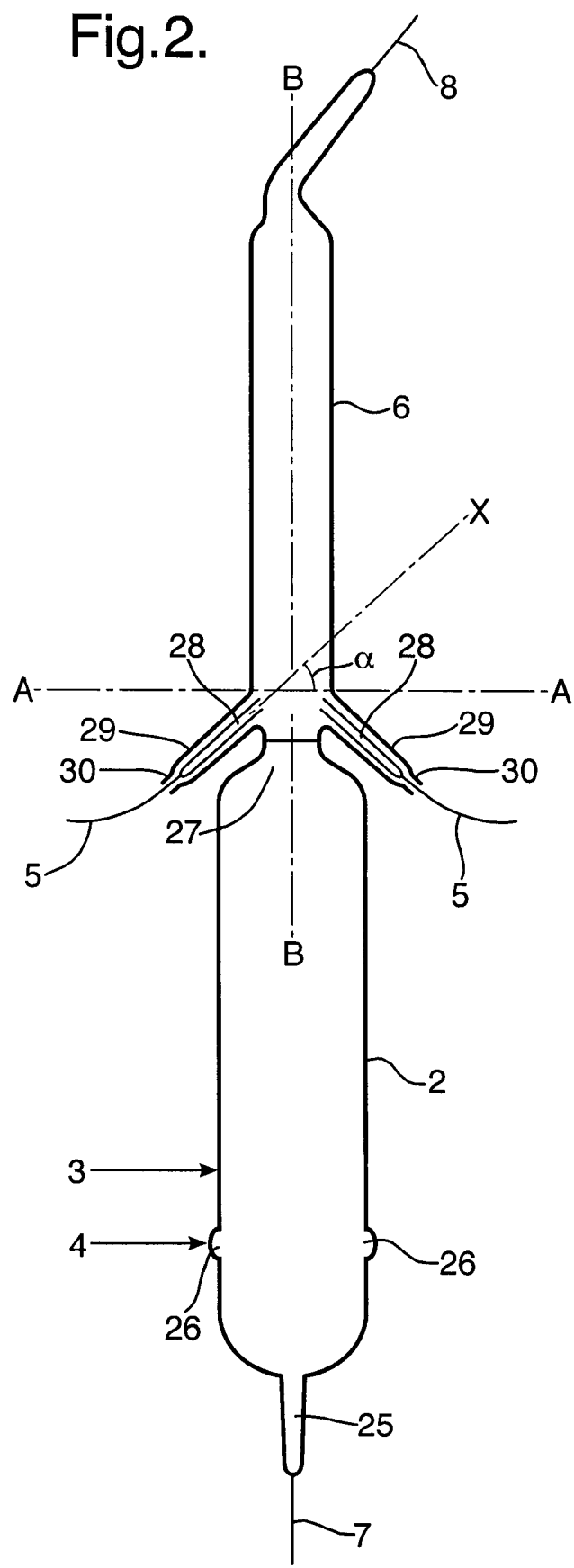
FIG. 2 schematically shows a longitudinal cross-section of a gasification reactor used in the system according to the present invention.

FIG. 2 shows a longitudinal cross-section of a gasification reactor 2 used in the system 1 of FIG. 1.

The gasification reactor 2 has an inlet 3 for a solid carbonaceous stream and an inlet 4 for an oxygen containing gas.

Usually several burners (schematically denoted by 26) are present in the gasification reactor 2 for performing the partial oxidation reaction. The pair of burners is directed horizontal and diametric as shown. For reasons of simplicity, only one pair of burners 26 is shown here.

Further, the gasification reactor 2 comprises an outlet 25 for removing the slag formed during the partial oxidation reaction via line 7.

Also, the gasification reactor 2 comprises an outlet 27 for the raw synthesis gas produced, which outlet 27 is connected with the cooling section 6.

The cooling section 6 comprises a first injector 28 (connected to line 17) that is adapted for injecting a water containing stream in the form of a mist in the cooling section.

As shown in FIG. 2, the first injector in use injects the mist in a direction away from the outlet 27 of the gasification reactor 2. To this end the centre line X of the mist injected by the first injector 28 forms an angle α of between 30-60°, preferably about 45°, with respect to the plane A-A perpendicular to the longitudinal axis B-B of the cooling section 6.

Preferably, the cooling section also comprises a second injector 29 (connected via line 30 to a source of shielding gas) adapted for injecting a shielding fluid at least partially surrounding the mist injected by the at least one first injector 28. As shown in the embodiment of FIG. 2 the first injector 28 is to this end partly surrounded by second injector 29.

As already discussed above in respect of FIG. 1, the partly cooled synthesis gas leaving the cooling section 6 via line 8 may be further cooled. Examples of such further cooling are provided in FIGS. 3 and 4.

Figure 3:
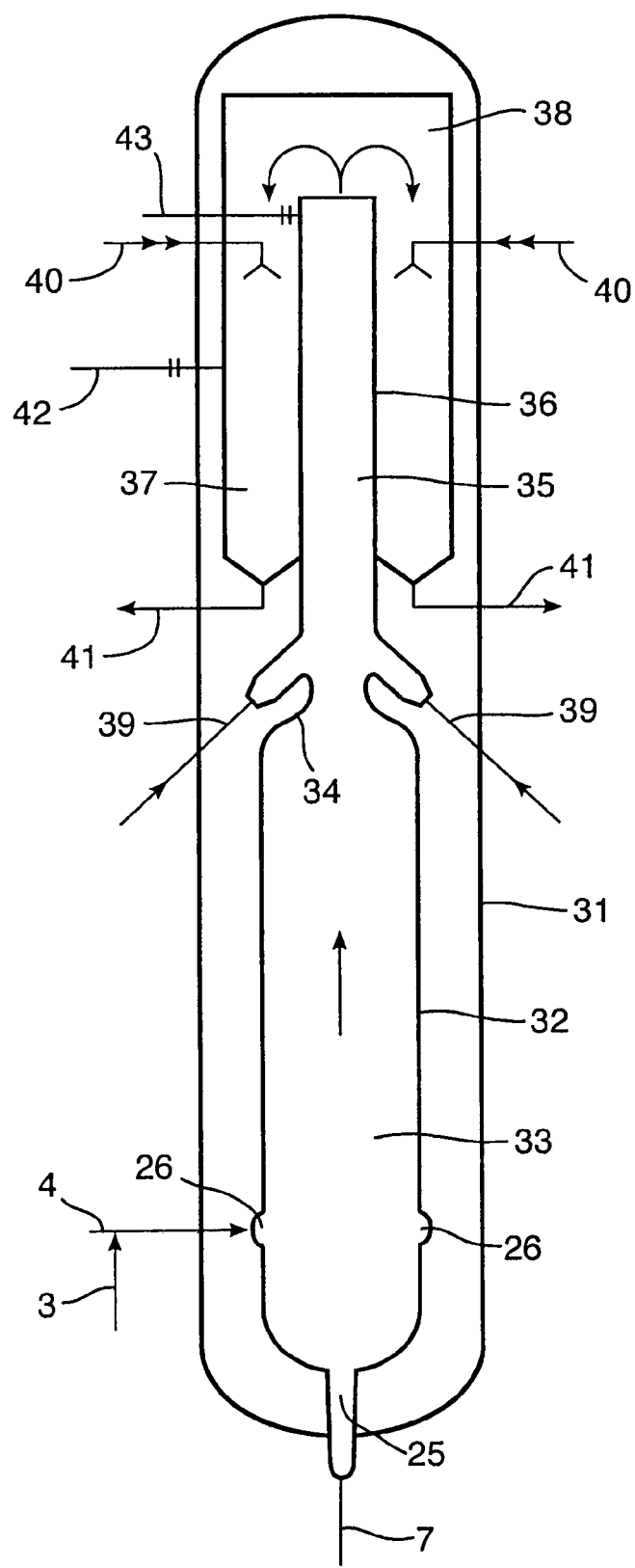
FIG. 3 schematically shows a longitudinal cross-section of a preferred gasification reactor, which may be used in a preferred embodiment of the system according to the present invention.

FIG. 3 illustrates a preferred gasification reactor comprising the following elements:
a pressure shell (31) for maintaining a pressure higher than atmospheric pressure;
an outlet (25) for removing the slag, preferably by means of a so-called slag bath, located in a lower part of the pressure shell (31);
a gasifier wall (32) arranged inside the pressure shell (31) defining a gasification chamber (33) wherein during operation the synthesis gas can be formed, a lower open part of the gasifier wall (32) which is in fluid communication with the outlet for removing slag (25). The open upper end (34) of the gasifier wall (32) is in fluid communication with a quench zone (35);
a quench zone (35) comprising a tubular formed part (36) positioned within the pressure shell (31), open at its lower and upper end and having a smaller diameter than the pressure shell (31) thereby defining an annular space (37) around the tubular part (36). The lower open end of the tubular formed part (36) is fluidly connected to the upper end of the gasifier wall (32). The upper open end of the tubular formed part (36) is in fluid communication with the annular space (37) via deflector space (38).

At the lower end of the tubular part (36) injecting means (39) are present for injecting a liquid or gaseous cooling medium to perform the first cooling. Preferably the direction of said injection is as described for FIG. 2 in case of liquid injections. In the annular space (37) injecting means (40) are present to inject liquid water, preferably in the form of a mist, preferably in a downwardly direction, into the partly cooled synthesis gas as it flows through said annular space (37) to perform the second cooling. FIG. 3 further shows an outlet (41) for synthesis gas is present in the wall of the pressure shell (31) fluidly connected to the lower end of said annular space (37). Preferably the quench zone is provided with cleaning means (42) and/or (43), which are preferably mechanical rappers, which by means of vibration avoids and/or removes solids accumulating on the surfaces of the tubular part and/or of the annular space respectively.

The advantages of the reactor according to FIG. 3 are its compactness in combination with its simple design. By cooling with the liquid in the form of a mist in the annular space (37) additional cooling means in said part of the reactor can be omitted which makes the reactor more simple. Preferably both via injectors (39) and injectors (40) liquid water is injected in the form of a mist as described above.

Figure 4:
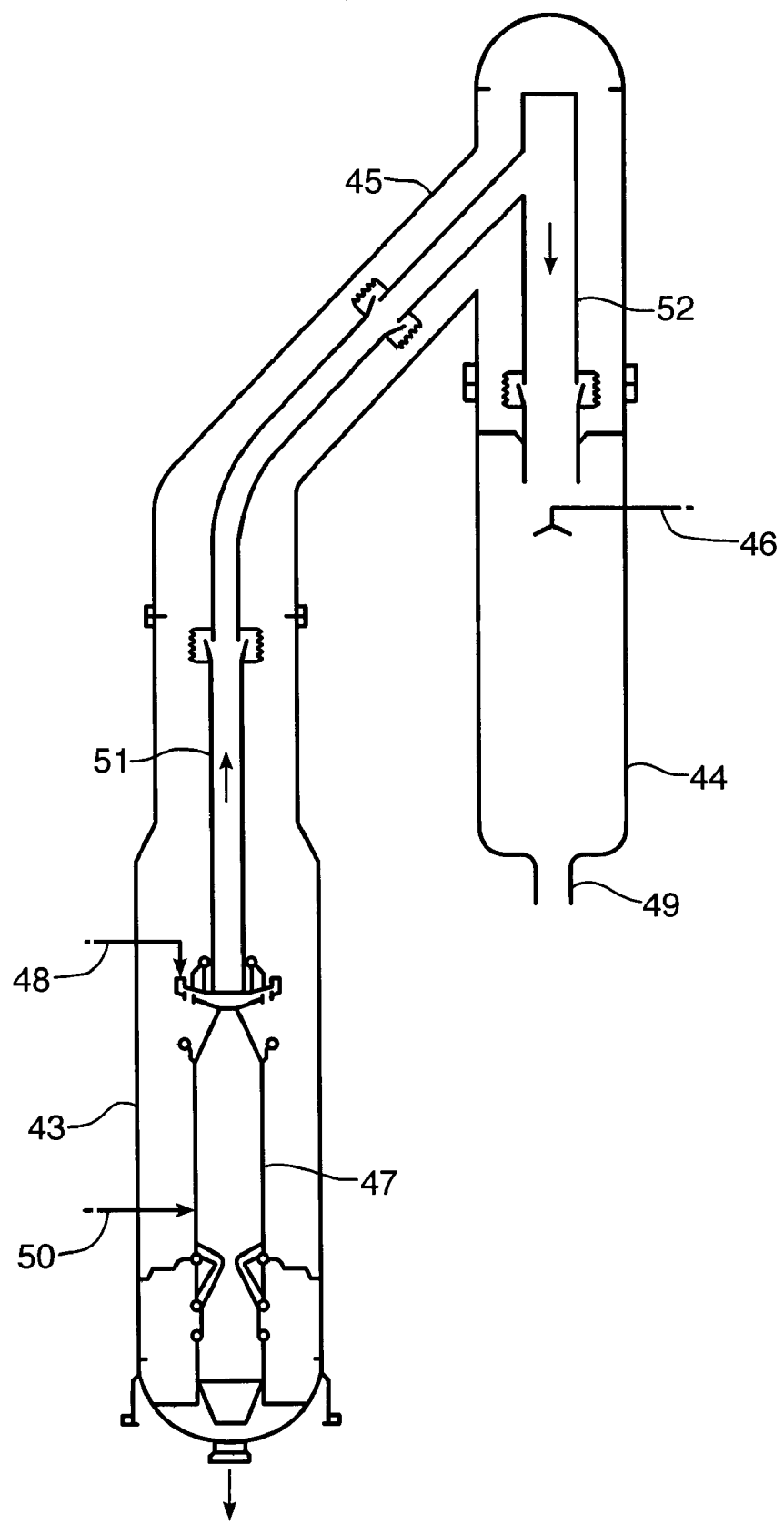
FIG. 4 schematically shows a gasification reactor system for performing the two-step cooling method making use of a separate downstream vessel.

FIG. 4 illustrates an embodiment for performing the two-step cooling method making use of a separate vessel. FIG. 4 shows the gasification reactor (43) of FIG. 1 of WO-A-2004/005438 in combination with a downstream quench vessel (44) fluidly connected by transfer duct (45). The system of FIG. 4 differs from the system disclosed in FIG. 1 of WO-A-2004/005438 in that the syngas cooler (3) of said FIG. 1 of said patent publication is omitted and replaced by a simple vessel comprising means (46) to add liquid water to perform the second cooling. Shown in FIG. 4 is the gasifier wall (47), which is connected to a tubular part (51), which in turn is connected to an upper wall part (52) as present in quench vessel (44). At the lower end of the tubular part (51) injecting means (48) are present for injecting a liquid or gaseous cooling medium to perform the first cooling as illustrated in FIG. 2. Quench vessel (44) is further provided with an outlet (49) for cooled synthesis gas. FIG. 4 also shows a burner (50). The various other details of the gasification reactor (43) and the transfer duct (45) as well as the upper design of the quench vessel (44) are preferably as disclosed for the apparatus of FIG. 1 of WO-A-2004/005438.

Figure 5:
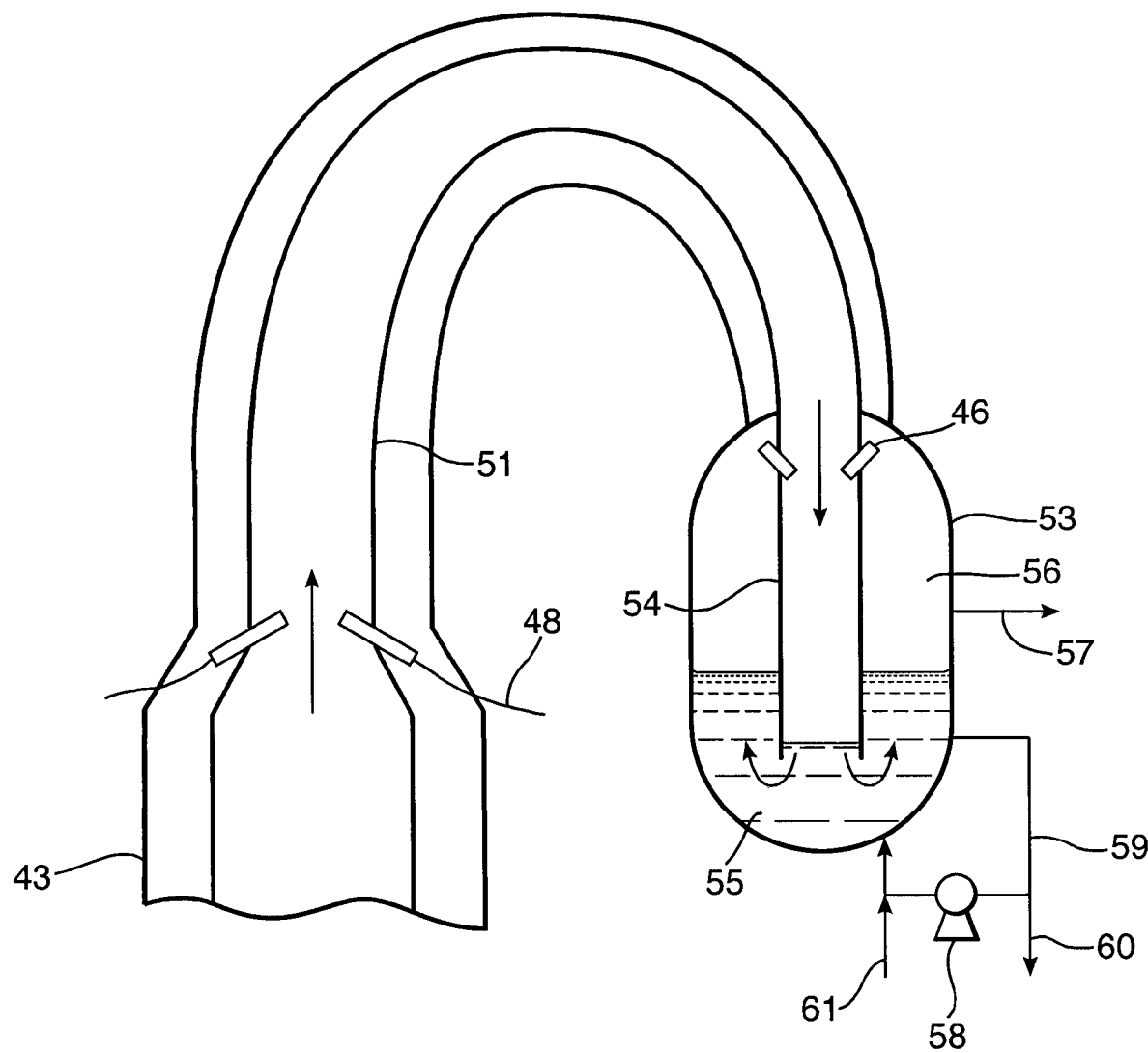
FIG. 5 schematically shows a preferred embodiment for the gasification reactor system of FIG. 4.

FIG. 5 shows the upper end of gasification reactor (43) and the upper end of gasification chamber wall (47). This upper end is fluidly connected by means of connecting conduit (51) to separate cooling vessel (53). Injecting means (48) are present to inject a gaseous or liquid quenching medium in accordance with the process of the present invention.

In cooling vessel (53) a dip tube (54) is present to create a downwardly directed flow path for synthesis gas. At the upper end of the dip-tube (54) injecting means (46) are present to inject a mist of liquid water into the synthesis gas. The dip-tube is partly submerged in a water bath (55). In use the synthesis gas will flow through water bath (55) to an annular space (56) as present between dip-tube (54) and the wall of the cooling vessel (53). From said annular space (56) the water saturated synthesis gas is discharged from said cooling vessel via conduit (57).

FIG. 5 also shows a pump (58) to recirculate water (59), providing a bleed stream (60) and a supply stream (61) for fresh water.

The person skilled in the art will readily understand that the present invention may be modified in various ways without departing from the scope as defined in the claims.

Example 1

A hot synthesis gas is obtained by performing a partial oxidation of a coal feedstock. The hot synthesis gas is quenched with recycled cold synthesis gas to obtain the gas having the properties and composition of stream 5 in FIG. 1. Table 1 further provides flow rates, properties and compositions of various streams in FIG. 1. This example shows that with the present process a synthesis gas composition can be prepared having a sufficient steam content to perform a water shift reaction.

(b) performing a partial oxidation of the carbonaceous feedstock in said burner to obtain a stream of hot synthesis gas which flows upwardly relative to the burner and a liquid slag which flows downwardly relative to the burner, (c) cooling the hot synthesis gas by first cooling the gas to a temperature of between 500 and 900° C. by injecting a gaseous or liquid cooling medium into the synthesis gas and subsequently cooling the gas to below 500° C. by directly contacting with water, (d) separating solids from the cooled synthesis gas by means of a water scrubbing process step, (e) performing a water shift reaction on at least part of the scrubbed synthesis gas, (f) separating sulphur compounds, carbon dioxide and other possible impurities from the shifted gas to obtain a purified synthesis gas, and (g) performing a Fischer-Tropsch synthesis using the purified synthesis gas of step (f) to obtain a synthesis product comprising paraffinic hydrocarbons.

2. A process according to claim 1, wherein in step (a) the carbonaceous feedstock is fed to the burner as a mixture of solid carbonaceous particles in a carrier gas.

3. A process according to claim 2, wherein the carrier gas is carbon dioxide.

4. A process according to claim 1, wherein the hot synthesis gas in step (b) has a temperature of between 1400 and 1800° C. and a pressure of between 20 and 100 bar.

5. A process according to claim 1, wherein the second cooling is performed by injecting a mist of water droplets into the synthesis gas.

6. A process according to claim 5, wherein the injected water mist has a temperature of at most 50° C. below the bubble point of water at the pressure of the hot synthesis gas.

7. A process according to claim 5, wherein the mist comprises droplets having a diameter of from 50 to 200 μm.

TABLE 1

| | | Stream Number in FIG. 1 | | | | | | |
|---|---|---|---|---|---|---|---|---|
| | | 5 | 17 | 8 | 10 | 21 | 12 + 20a | 22 |
| Temperature | ° C. | 899 | 230 | 425 | 424 | 230 | 213 (*) | 212 |
| Pressure | BAR | 41 | 45 | 41 | 39 | 45 | 38 | 42 |
| Total Mass Rate | KG/SEC | 103 | 22 | 141 | 142.2 | 38.3 | 108.9 | 9.9 |
| Total Molar Comp. (%) | | | | | | | | |
| $H_2O$ | | 31.0 | 100.0 | 46.3 | 46.0 | 100.0 | 56.2 | 99.8 |
| $H_2$ | | 19.0 | 0.0 | 14.7 | 14.6 | 0.0 | 11.9 | 0.0 |
| CO | | 40.3 | 0.0 | 31.4 | 31.2 | 0.0 | 25.4 | 0.0 |
| $CO_2$ | | 5.1 | 0.0 | 4.0 | 4.0 | 0.0 | 3.2 | 0.0 |
| $H_2S$ | | 0.1 | 0.0 | 0.1 | 0.1 | 0.0 | 0.1 | 0.0 |
| $N_2$ | | 4.2 | 0.0 | 3.4 | 4.0 | 0.0 | 3.2 | 0.0 |
| Ar | | 0.1 | 0.0 | 0.1 | 0.1 | 0.0 | 0.0 | 0.0 |
| Totals | | 99.8 | 100.0 | 100.0 | 100.0 | 100.0 | 100.0 | 99.8 |

(*) prior to heat exchanger 15

The invention claimed is:

1. A process to prepare a paraffinic hydrocarbon from a solid carbonaceous feedstock by performing the following steps, (a) feeding an oxygen comprising gas and the carbonaceous feedstock to a burner positioned horizontal and firing into a reactor vessel, 8. A process according to claim 5, wherein the mist is injected with a velocity of between 30-100 m/s.

9. A process according to claim 5, wherein the mist is injected using an atomising gas with an injection pressure between 5 and 20 bar above the pressure of the raw synthesis gas.

10. A process according to claim 1, wherein the second cooling is performed by injecting water into the synthesis gas or by passing the synthesis gas through a water bath to obtain a synthesis gas having a weight ratio of synthesis gas and water of between 1:1 to 1:4 and wherein the cooled synthesis gas obtained in step (c) is directly used as feed to the scrubbing step of step (d).

11. A process according to claim 10, wherein the second cooling is performed by injecting a mist of water droplets into the synthesis gas.

12. A process according to claim 1, wherein said first cooling is performed by injecting a mist of water droplets into the synthesis gas.

13. A process according to claim 12, wherein the injected water mist has a temperature of at most 50° C. below the bubble point of water at the pressure of the hot synthesis gas.

14. A process according to claim 12, wherein the mist comprises droplets having a diameter of from 50 to 200 μm.

15. A process according to claim 12, wherein the mist is injected with a velocity of between 30-100 m/s.

16. A process according to claim 12, wherein the mist is injected using an atomising gas with an injection pressure between 5 and 20 bar above the pressure of the raw synthesis gas.

17. A process according to claim 1, wherein the water used in step (c) is the water by-product as obtained in step (g).

18. A process according to claim 1, wherein the water used in step (c) is the water condensate by-product as obtained in step (e).

19. A process according to claim 1, wherein only part of the scrubbed synthesis gas is subjected to step (e) and wherein the remaining synthesis gas, which gas by-passes step (e), is combined with the shifted synthesis gas, to obtain a combined synthesis gas having a hydrogen to carbon monoxide molar ratio of between 1.4 and 1.95.

20. A process according to claim 1, wherein step (g) is performed in the presence of an iron or cobalt comprising catalyst.

21. A process according to any claim 1, wherein the Fischer-Tropsch synthesis product obtained in step (g) is subjected to a hydroprocessing step to obtain a hydroprocessed effluent from which a middle distillate fuel is isolated.

* * * * *